Patented July 16, 1946

2,404,024

UNITED STATES PATENT OFFICE 2,404,024

CONVERSION CATALYST

James C. Bailie, Chicago, Ill., Llewellyn Heard, Hammond, Ind., and Rodney V. Shankland, Chicago, Ill., assignors to Standard Oil Company, Chicago, Ill., a corporation of Indiana No Drawing. Application May 14, 1943, Serial No. 487,024

4 Claims. (Cl. 196—52)

This invention relates to the conversion of hydrocarbons and more particularly to the conversion of hydrocarbon oils with catalysts of the contact type. Still more specifically the invention relates to improvements in catalysts for the conversion of hydrocarbons including cracking of heavy oils and reforming or hydroforming of gasoline and naphthas.

One object of the invention is to provide a hydrocarbon conversion catalyst having a high conversion activity and high resistance to deterioration. Another object of the invention is to provide a conversion catalyst containing alumina in an unusual form. Other objects of the invention will be apparent from the description which follows:

In the conversion of hydrocarbon oils, for example the cracking of gas oils and motor fuels, the reforming of gasoline, the hydroforming of naphthas to increase knock rating or the aromatization of naphthas to produce toluene and other aromatics, it has heretofore been the practice to employ various contact catalysts over which the hydrocarbon vapors are conducted at elevated temperature, generally in the range of about 800 to 1100° F. The catalyst may be a metal oxide or mixture of metal oxides of a refractory nature and may be employed as a stationary bed or moving bed of catalyst in granular or pelleted form, or the catalyst may be suspended in the hydrocarbon vapors undergoing conversion in which case it is usually employed in the form of a powder; for example, a powder having a particle size indicated by its passage through screens of 10 mesh to 100 mesh or finer, for example 200 to 300 mesh. The severity of the treatment is controlled by the temperature and the time of contact between the hydrocarbon and catalyst, the time of contact usually being expressed by the space velocity in terms of volumes of liquid hydrocarbon charged per hour per volume of catalyst. Space velocities usually employed vary from about 0.1 to 10. In the case of powdered catalysts the space velocity is less significant and the "weight velocity" is usually employed as a measure of contact time. This is the weight of oil per hour per unit weight of catalyst in the reactor at conversion temperature. Numerically, the weight velocity does not usually differ greatly from the space velocity.

Pressures employed vary from atmospheric pressure to several hundred pounds per square inch, for example 100 to 400 pounds per square inch. Cracking reactions are usually conducted at a relatively low pressure while naphtha conversion is often conducted at a higher pressure of the order of 200 to 400 pounds per square inch. After the catalyst has been in use for a short time, which may vary from about fifteen minutes to several hours, sometimes as long as ten to twenty hours, the catalyst activity becomes substantially impaired as a result of deposition of carbonaceous matter on the catalyst surfaces. This is periodically removed by combustion with air or other oxygen-containing gas, care being taken to avoid excessive temperature during the regeneration treatment. In general, temperatures of 950 to 1200° F. are satisfactory for regeneration. The regenerated catalyst can then be reemployed in the conversion operation for an indefinite number of times. The life of the catalyst is determined by the permanent deactivation which occurs and which limits the number of times that the catalyst can be profitably regenerated.

One constituent of many hydrocarbon conversion catalysts is Activated Alumina or aluminum oxide. In cracking catalysts, alumina may be intimately associated with silica, titania, zirconia, or other metal oxide in varying proportions usually of the order of 2 to 30 percent. In catalysts effective for reforming or hydroforming naphthas, aromatization, isomerization of gasoline, butane or naphtha fractions and high temperature alkylation with hydrocarbon gases, alumina may commonly be the chief constituent of the catalyst forming from 70 to 95 percent of the total catalyst. Other ingredients or promoters may be oxides of sixth group elements particularly chromium and molybdenum oxides, or vanadium oxide.

In the preparation of these hydrocarbon conversion catalysts the condition and form of the metal oxide ingredients are factors of the utmost importance, determining catalytic activity, catalyst life, distribution of conversion products, physical strength and other properties. The purity of the catalyst ingredients is one such factor, pure materials sometimes giving catalysts of increased efficiency and sometimes having the opposite effect. Allotropic forms of metal oxides, physical structure, degree of hydration, etc. are all fundamental factors in determining catalyst activity. These factors are usually determined by the source of the material and the manner of catalyst preparation. Thus one of the more active forms of silica is silica gel. Siliceous clay may be treated with acids to produce active catalysts consisting largely of silica in combination with alumina and other catalytic oxides. Small proportions of alkali metal oxides sometimes have a promoting effect, but when the amount is more than about 0.1 percent, the catalyst activity is often impaired or the catalyst life is seriously reduced. This is particularly the case with aluminum oxide catalysts.

Aluminum oxide has been employed in the form of bauxite, gibbsite, acid treated bauxite, etc. It has also been prepared artificially in various ways, for example by precipitation of the hydroxide from aluminum salts and ignition of the hydroxide to convert it to the oxide. Various allotropic forms of aluminum oxide are recognized and data indicate that in the conversion of hydrocarbons the gamma form is much more active than the alpha form. Under hydrocarbon conversion conditions data indicate that the gamma form tends to allotropize to the less active form, thus resulting in permanent catalyst deterioration. The presence of other ingredients appears to hasten or retard this undesirable transformation.

According to our invention, we have found that highly active hydrocarbon conversion catalysts may be made from aluminum dross, a by-product obtained in the handling of molten aluminum in aluminum foundries. Aluminum dross has an indefinite composition and contains metallic aluminum and aluminum oxide, accompanied by other materials not identified. As received it is only slightly attacked by organic acids while inorganic acids such as hydrochloric acid attack it to a greater extent. We have discovered that if it is ground in a ball mill it is attacked to a still greater extent with the formation of catalytic material.

We have devised various methods for making catalysts from aluminum dross as will be shown in the following examples:

Example I

Aluminum dross was added to 15% hydrochloric acid solution in small portions. The solution became quite hot with foaming after each addition of dross. After standing over night the solution was decanted and ammonium hydroxide was added until the solution reacted basic to litmus paper. The solid which separated was filtered off and washed moderately, was then dried at 250° F. and calcined for sixteen hours at 1000° F. The granular material obtained in this manner was impregnated with ammonium molybdate solution in concentration and amount calculated to give a catalyst containing 9% of molybdenum oxide. The catalyst was again heated at 1050° F. for two hours, cooled, and then pelleted. This catalyst was employed in the conversion of Mid-Continent light naphtha at 980° F. and 200 pounds per square inch pressure. Hydrogen was introduced at the rate of 2500 cubic feet per barrel of naphtha and the naphtha was charged at the rate of about one volume per hour per volume of catalyst. The following conversion results were obtained after six hours' reaction. The results are compared with a commerical promoted alumina catalyst employed under the same conditions.

| Conversion products | Catalyst | |
|---|---|---|
| | Aluminum dross | Commercial |
| Liquid, vol. per cent | 65.8 | 73.3 |
| Gas, wt. per cent | 29.2 | 23.1 |
| Carbon, wt. per cent | 0.21 | 0.18 |
| Toluene, vol. per cent on feed | 19.8 | 15.6 |
| Toluene, vol. per cent in fraction boiling 205 to 255° F | 82.4 | 59.4 |
| Knock rating of gasoline fraction, ASTM | 85.9 | 79.5 |

These data show that the new catalyst from aluminum dross produces a higher yield of toluene and about the same amount of carbon as the commercial catalyst. In a modification of the foregoing procedure for making catalyst from aluminum dross, the dross is treated with hydrochloric acid and then with ammonia in sufficient amount to neutralize the acid. In certain cases the resulting product may be dried directly without filtering or washing. On ignition at elevated temperature, ammonium salts are volatilized leaving the catalyst in a highly active state. This method of preparing the catalyst has the advantage of converting all of the aluminum dross into catalytic material without the need of washing gelatinous masses.

In another example, we have prepared a hydroforming catalyst by grinding aluminum dross in a ball mill with an organic acid, for example formic, citric, or acetic acid. On cessation of the reaction between the acid and the dross, a suitable promoter, e. g. ammonium molybdate, may be added in the required amount, thoroughly agitated with the catalyst and then dried. If desired, the promoter may be added to the catalyst after drying and igniting. When formic acid is used in this way, little or no carbon is formed on igniting the catalyst, thereby avoiding the necessity of burning off carbonaceous deposits from the catalyst surface. The following is an example of this method of catalyst manufacture:

Example II

Aluminum dross is ball milled with formic acid in the ratio of 400 grams of dross, 300 ml. of water and 150 ml. of 88% formic acid for eighteen to twenty-four hours at ordinary temperature. The mixture may then be further treated with acetic or other acid by refluxing for two to five hours. The mixture may then be filtered to separate undissolved dross, if desired, and the filtrate allowed to gel after stirring with ammonium carbonate or other suitable gelling agent. The resulting gel was dried to produce the desired catalyst, preferably after washing, to remove water-soluble salts.

Example III

By this method, 250 grams of dross and 250 cc. of water were ball-milled with 100 ml. glacial acetic acid and one gram of mercuric oxide. The mixture was then heated and refluxed with 2500 ml. of water and one gram of mercuric oxide for three hours. A syrupy product was obtained. This product was precipitated with ammonium hydroxide, filtered and placed in a steam bath to dry.

Example IV

Dry aluminum dross was ball milled to about 200 mesh and then slowly added to dilute hydrochloric acid—one kilogram of dross to 3600 ml. of 38 percent HCl in 7200 ml. of water. Care was taken to add the dross to the acid gradually to avoid trouble from foaming, the reaction being completed when no further foaming occurred.

The reaction mixture was allowed to settle for twenty-four hours, then filtered and the clear liquor was treated with ammonium hydroxide by rapidly stirring with a mechanical agitator, a small excess of ammonia being added. The precipitated material was washed by filtering and reslurrying five to six times, employing distilled water to which a small amount of ammonium hydroxide was added.

The washed dross catalyst was dried and calcined at 1100° F., then impregnated with molybdenum oxide by immersing in an aqueous solution of ammonium molybdate. If desired, the catalyst may be impregnated by stirring the undried material into an aqueous solution of ammonium molybdate. After impregnation the catalyst was again dried and formed into pellets with a pelleting machine. Pellets of ⅛″ diameter are suitable. The pelleted catalyst was then calcined at 1100° F. and employed in the reforming or hydroforming of light naphtha from Mid-Continent petroleum having a knock rating of about 55 ASTM. Hydrogen was employed at the rate of about 2500 cubic feet per barrel of naphtha at a pressure of about 200 pounds per square inch. The following results are averages of 3 to 4 conversion runs using the catalyst just described:

| | | |
|---|---|---|
| Temp., °F | 980 | 980 |
| Space velocity, v./h./v | 2 | 1 |
| Liquid product, vol. per cent | 72.7 | 61.1 |
| Carbon, wt. per cent | 0.12 | 0.22 |
| Knock rating of gasoline, ASTM | 81.8 | 88.8 |
| Toluene, per cent of charge | 16.8 | 19.9 |

*Example V*

One kilogram of dross was mixed with 3200 ml. of water and 400 ml. of concentrated hydrochloric acid. The mixture was heated for about three hours and water was added occasionally to restore the original volume. When gas evolution had ceased the mixture was cooled and then ground for twenty-four hours in a ball mill to a gray soup. After heating for about one hour with mechanical stirring the mixture thickened until further stirring was practically impossible. On cooling, the mixture was precipitated with concentrated ammonium hydroxide, filtered and dried on the steam bath. Two small samples were then examined as follows: (1) A sample was weighed, calcined, and reweighed to determine the amount of nonvolatile matter; (2) A sample was weighed and the quantity of water required to give a mortar-like consistency was determined. The lumps of product were then broken up, weighed, and the correct amount of ammonium paramolybdate solution required to yield a catalyst of 9 percent $MoO_3$ was added in sufficient water to give the catalyst a mortar-like consistency. After thorough mixing, a dough-like material was obtained. It was dried on the steam bath and further heated for twenty-four hours at 700° F. in a muffle furnace. It was then pelleted with 10 percent of an organic lubricant and 20 percent water and finally ignited at 900 to 950° F. in a controlled stream of air. The following results were obtained with this catalyst in the conversion of light naphtha under the conditions substantially as described in Example IV.

| | | | | | | |
|---|---|---|---|---|---|---|
| Cat. temp., °F | 977 | 982 | 977 | 980 | 980 | 979 |
| Space velocity, v./h./v | 1.0 | 1.0 | 1.0 | 1.98 | 1.99 | 1.99 |
| Liquid product, vol. per cent | 77.6 | 77.6 | 77.9 | 84.8 | 83.6 | 85.6 |
| Carbon, wt. per cent | .10 | .12 | .09 | .05 | .07 | .06 |
| Knock rating of gasoline, ASTM | 76.9 | 77.1 | 77.7 | 69.6 | 72.2 | 70.5 |
| Toluene, per cent of feed | 15.1 | 15.0 | 15.6 | 8.1 | 11.6 | 10.0 |

Although the activity of this catalyst was lower than other preparations, the carbon formation was unusually low.

*Example VI*

Aluminum dross was added to 15 percent HCl solution, in small portions at a time. The solution became quite hot, with foaming after each addition of dross. After reaction had ceased a mechanical stirrer was introduced and, without separation of unreacted dross, ammonium hydroxide was added until the resulting product reacted basic to litmus paper. The slurry was then filtered with suction and washed by stirring the soft cake with about an equal volume of water for ten minutes, suction-filtering again and reslurrying. The washing operation was repeated five times. After the final filtering the soft cake was slurried for ten minutes with aqueous ammonium paramolybdate in such amount as to yield a final catalyst containing 9.0% $MoO_3$. The product was then placed in shallow aluminum trays and dried slowly in a steam oven. After drying the raw catalyst was ground and pelleted, and calcined at 1100° F. in a controlled stream of air.

Mid-Continent light naphtha having a boiling range of about 196 to 260° F. was hydroformed with a sample of the above catalyst. Results obtained were as follows:

| | | | | |
|---|---|---|---|---|
| Average catalyst temp., °F | 981 | 980 | 979 | 980 |
| Space velocity, v./h./v | 98 | 1.03 | 1.02 | 1.00 |
| Cu. ft. of hydrogen/42 gallons feed | 2,880 | 2,500 | 2,500 | 2,500 |
| Liquid product, vol. percent | 68.8 | 71.6 | 73.2 | 69.0 |
| Gas, wt. percent | 26.8 | 23.5 | 22.2 | 26.5 |
| Carbon, wt. percent | — | .12 | .14 | .13 |
| Recovery, wt. percent | 99.0 | 99.7 | 95.6 | 98.8 |
| Knock rating, A.S.T.M | 84.8 | 82.0 | 85.0 | 84.9 |
| Toluene, vol. percent on feed stock | 17.6 | 19.6 | 19.6 | 18.5 |
| Percent toluene in 205–255° F. fraction | 73 | 68 | 78 | 79 |

The catalysts made from aluminum dross, according to our process, are usually promoted by the addition of various metal oxides, for example oxides of vanadium, chromium, molybdenum, tungsten, cobalt, copper, manganese and nickel. The promoter metal oxide may be added, usually in the amount of 2 to 20 percent, preferably about 5 to 10 percent, to the catalyst mixture during the treatment of the aluminum dross with acid or at some other stage of the preparation, or after ignition of the activated aluminum dross catalyst. When added after ignition, it is generally desirable to re-ignite the catalyst containing the promoter element. The promoter may be added as the oxide or hydroxide by thorough mixing or it may be added in solution as a salt, for example as the nitrate, chloride, or preferably as a salt with ammonia in which the promoter metal is found in the anion, for example, ammonium chromate or vanadate. Where silica gel is employed as an ingredient of the catalyst it may be incorporated as the dehydrated gel, or in the form of the gelatinous hydrogel.

Having thus described our invention what we claim is:

1. The process of reforming petroleum naphtha which comprises subjecting the vapors of said naphtha and hydrogen at 800–1100° F. and a space velocity of about 0.1 to 10 to the action of a refractory solid metal oxide catalyst consisting essentially of active alumina prepared from aluminum dross by treating with acid until substantially all gas evolution has ceased, precipitating, drying and igniting the resulting aluminum oxide and promoting the catalyst for the reforming reaction by about 2 to 20 percent of a group VI metal oxide, the promoter being introduced by adding a salt of said group VI metal before drying the said alumina.

2. The process of claim 1 wherein the group VI metal oxide is chromium oxide.

3. The process of claim 1 wherein the group VI metal oxide is molybdenum oxide.

4. The process of reforming petroleum naphtha which comprises subjecting the vapors of said naphtha and hydrogen at 800 to 1000° F. and a space velocity of about 0.1 to 10 to the action of a refractory metal oxide catalyst consisting essentially of active alumina prepared from aluminum dross by treating with an organic acid until substantially all gas evolution has ceased, coagulating the acid solution by adding an electrolyte to produce a firm aluminum oxide gel, drying and igniting the resulting gel and promoting the catalyst for the reforming reaction by about 2 to 20 per cent of a group VI metal oxide, the promoter being introduced by adding a salt of said group VI metal before drying the said alumina gel.

JAMES C. BAILIE.
LLEWELLYN HEARD.
RODNEY V. SHANKLAND.